United States Patent
Yuasa et al.

(10) Patent No.: US 10,170,938 B2
(45) Date of Patent: Jan. 1, 2019

(54) ELECTRIC POWER RECEIVING DEVICE AND ELECTRIC POWER TRANSMISSION DEVICE

(71) Applicants: TOYOTA JIDOSHA KABUSHIKI KAISHA, Toyota-shi, Aichi-ken (JP); NIPPON SOKEN, INC., Nishio, Aichi (JP)

(72) Inventors: Hiroaki Yuasa, Miyoshi (JP); Ryohei Nishizaki, Toyota (JP); Norihito Kimura, Hekinan (JP)

(73) Assignees: TOYOTA JIDOSHA KABUSHIKI KAISHA, Toyota (JP); NIPPON SOKEN, INC., Nishio (JP)

( * ) Notice: Subject to any disclaimer, the term of this patent is extended or adjusted under 35 U.S.C. 154(b) by 300 days.

(21) Appl. No.: 15/085,481

(22) Filed: Mar. 30, 2016

(65) Prior Publication Data
US 2016/0294222 A1    Oct. 6, 2016

(30) Foreign Application Priority Data

Apr. 3, 2015   (JP) ................................. 2015-076947

(51) Int. Cl.
| | |
|---|---|
| B60L 11/18 | (2006.01) |
| H02J 50/12 | (2016.01) |
| H02J 7/02 | (2016.01) |
| H02J 7/00 | (2006.01) |
| H01F 27/02 | (2006.01) |
| H01F 27/36 | (2006.01) |
| H01F 38/14 | (2006.01) |

(52) U.S. Cl.
CPC ............. *H02J 50/12* (2016.02); *B60L 11/182* (2013.01); *B60L 11/1824* (2013.01); *H01F 27/02* (2013.01); *H01F 27/365* (2013.01); *H01F 38/14* (2013.01); *H02J 7/0027* (2013.01); *H02J 7/025* (2013.01); *B60L 2230/10* (2013.01); *Y02T 10/7005* (2013.01); *Y02T 10/7088* (2013.01); *Y02T 90/12* (2013.01); *Y02T 90/121* (2013.01); *Y02T 90/122* (2013.01); *Y02T 90/14* (2013.01)

(58) Field of Classification Search
CPC ............... B60L 11/182; B60L 11/1824; B60L 2230/10; H01F 27/02; H01F 27/365; H01F 38/14; H02J 50/12; H02J 7/0027; H02J 7/025; Y02T 10/7005; Y02T 10/7088; Y02T 90/12; Y02T 90/121; Y02T 90/122; Y02T 90/14
USPC ........................................................ 307/104
See application file for complete search history.

(56) References Cited

U.S. PATENT DOCUMENTS

| | | |
|---|---|---|
| 2013/0127409 A1 | 5/2013 | Ichikawa |
| 2013/0193749 A1 | 8/2013 | Nakamura et al. |

(Continued)

FOREIGN PATENT DOCUMENTS

| | | |
|---|---|---|
| CN | 104377961 A | 2/2015 |
| JP | 2013-080785 A | 5/2013 |

(Continued)

*Primary Examiner* — Rexford Barnie
*Assistant Examiner* — Toan Vu
(74) *Attorney, Agent, or Firm* — Oliff PLC

(57) ABSTRACT

An electric power receiving device has an electric power receiving unit that contactlessly receives electric power from an electric power transmission device, and the power receiving unit includes a first node, a second node, and a capacitor, a coil, a capacitor, a coil, and a capacitor, which are sequentially connected in series, between the first node and the second node.

8 Claims, 9 Drawing Sheets

(56) References Cited

U.S. PATENT DOCUMENTS

2015/0008877 A1    1/2015   Ichikawa et al.
2015/0049517 A1    2/2015   Yan et al.

FOREIGN PATENT DOCUMENTS

| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |

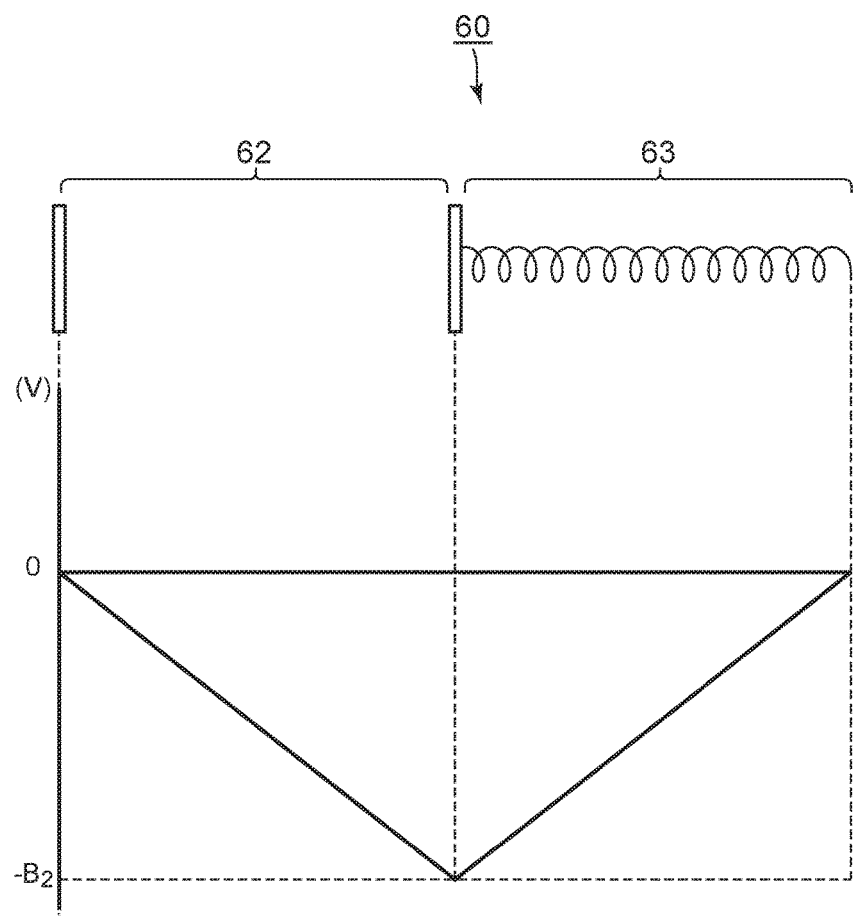
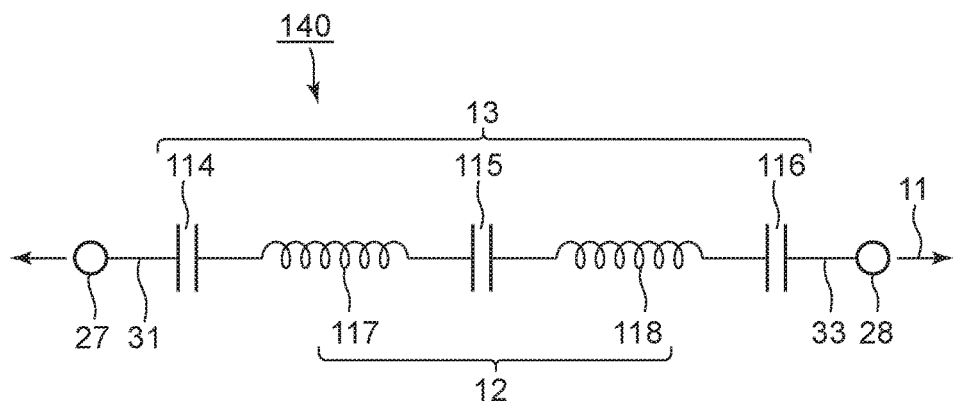

ELECTRIC POWER RECEIVING DEVICE AND ELECTRIC POWER TRANSMISSION DEVICE

INCORPORATION BY REFERENCE

The disclosure of Japanese Patent Application No. 2015-076947 filed on Apr. 3, 2015 including the specification, drawings and abstract is incorporated herein by reference in its entirety.

BACKGROUND

1. Field

The disclosure relates to an electric power receiving device and an electric power transmission device.

2. Description of Related Art

Various types of electric power transmission systems for contactlessly or wirelessly transmitting electric power from an electric power transmission device to an electric power receiving device have been proposed.

The power receiving device includes an electric power receiving unit including a resonance circuit, and a case that houses the power receiving unit, and the resonance circuit includes a power receiving coil and a power receiving capacitor. The power transmission device includes an electric power transmission unit including a resonance circuit, and a case that houses the power transmission unit, and the resonance circuit includes a power transmission coil and a power transmission capacitor.

Generally, the resonance circuit of each of the power receiving unit and the power transmission unit consists of one coil, and one capacitor connected to the coil.

If AC current is passed through the series LC resonance circuit, the voltage of the capacitor and the voltage of the coil vary according to the frequency of the AC current. At this time, the voltage phase of the capacitor and the voltage phase of the coil are in the reversed state. For example, the voltage rises in the coil when the voltage drops in the capacitor, and the voltage drops in the coil when the voltage rises in the capacitor. As a result, during transmission of electric power, the absolute value of a voltage at a connection point of the coil and the capacitor is larger than the absolute values of voltages at the other portions of the resonance circuit.

Since the absolute value of the voltage at the connection point of the coil and the capacitor is large, as described above, the absolute value of the average voltage of the resonance circuit as a whole becomes large.

Therefore, if a member, such as a case, is located around the resonance circuit of each of the power receiving unit and the power transmission unit, a potential difference between the resonance circuit and the case is large. In particular, a potential difference between the connection point of the capacitor and the coil and the case is large.

SUMMARY

The disclosure provides a power receiving device having a resonance circuit in which the absolute value of voltage is less likely or unlikely to be large. The disclosure also provides a power transmission device having a resonance circuit in which the absolute value of voltage is less likely or unlikely to be large.

An electric power receiving device according to a first aspect of the disclosure has an electric power receiving unit that contactlessly receives electric power from an electric power transmission device. The power receiving unit includes a first node, a second node, a first capacitor, a first coil, a second capacitor, a second coil, and a third capacitor, and the first capacitor, the first coil, the second capacitor, the second coil, and the third capacitor are sequentially connected in series, between the first node and the second node.

According to the power receiving device as described above, the voltage phase of the first capacitor, second capacitor, and the third capacitor and the voltage phase of the first coil and the second coil are in the reversed state. Therefore, at a point in time at which the voltage rises in the first coil and the second coil, for example, the voltage drops in the first capacitor, second capacitor, and the third capacitor.

If a coil formed by connecting the first coil and the second coil in series is compared with the first coil and the second coil, the amount of voltage rise that occurs in each of the first coil and the second coil is smaller than the amount of voltage rise that occurs in the coil formed by connecting the first coil and the second coil in series. Thus, the amount of voltage rise or voltage drop that occurs in each of the first coil and the second coil can be reduced.

Then, if the first capacitor and the second capacitor are disposed at the opposite ends of the first coil, the absolute value of the voltage of the first coil is less likely or unlikely to be increased. If the second capacitor and the fourth capacitor are disposed at the opposite ends of the second coil, the absolute value of the voltage of the second coil is less likely or unlikely to be increased.

Consequently, the voltage distribution among the first capacitor, first coil, second capacitor, second coil, and the third capacitor indicates relatively low voltages distributed in the power receiving unit as a whole.

An electric power transmission device according to a second aspect of the disclosure includes an electric power transmission unit that contactlessly transmits electric power to an electric power receiving device. The power transmission unit includes a third node, a fourth node, a fourth capacitor, a third coil, a fifth capacitor, a fourth coil, and a sixth capacitor, and the fourth capacitor, the third coil, the fifth capacitor, the fourth coil, and the sixth capacitor are sequentially connected in series, between the third node and the fourth node.

In the power transmission device as described above, the voltage distribution among the fourth capacitor, third coil, fifth capacitor, fourth coil, and the sixth capacitor indicates relatively low voltages distributed in the power transmission unit as a whole.

According to the power receiving device of this disclosure, relatively low voltages are distributed in the power receiving unit as a whole. According to the power transmission device of this disclosure, relatively low voltages are distributed in the power transmission unit as a whole.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 12 is a graph showing voltage distribution in the power receiving unit of the comparative example;

FIG. 13 is a schematic view showing a power transmission unit as a modified example of the embodiment of FIG. 4.

DETAILED DESCRIPTION OF EMBODIMENTS

Figure 1:
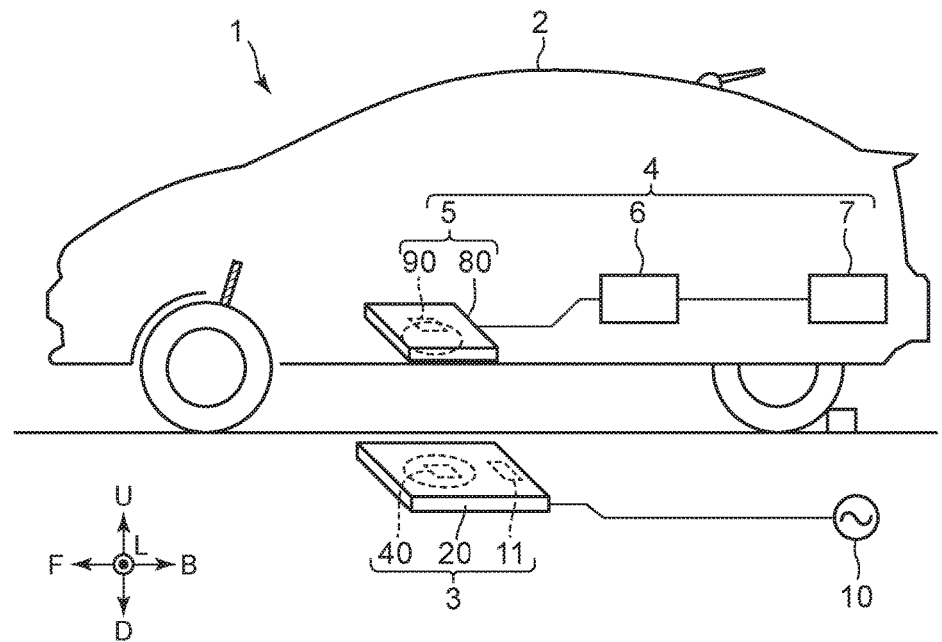
FIG. 1 is a schematic view schematically showing a contactless charging system.
Figure 2:
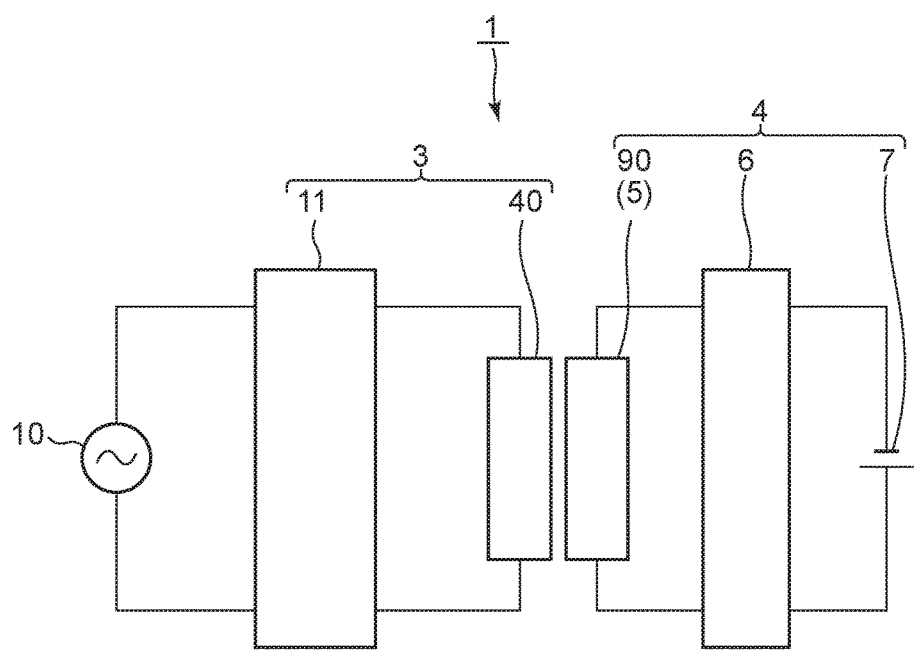
FIG. 2 is a circuit diagram schematically showing the contactless charging system.

FIG. 1 and FIG. 2 schematic show a contactless charging system 1. As shown in FIG. 1 and FIG. 2, the contactless charging system 1 includes an electric power receiving system 4 installed on a vehicle 2, and an electric power transmission device 3 that contactlessly or wirelessly transmits electric power to the power receiving system 4.

The power receiving system 4 includes an electric power receiving device 5, a rectifier 6 connected to the power receiving device 5, and a battery 7 connected to the rectifier 6. The rectifier 6 converts AC power supplied from the power receiving device 5 into DC power, and supplies the DC power to the battery 7. The power receiving device 5 includes an electric power receiving unit 90, and a case 80 that houses the power receiving unit 90. The battery 7 supplies electric power to a converter (not shown). The converter supplies the electric power to an inverter, which in turn supplies the electric power to a rotating electric machine. The rotating electric machine drives vehicle wheels, for example.

The power transmission device 3 includes an electric power transmission unit 40, a frequency converter 11 connected to the power transmission unit 40, and a case 20 that houses the frequency converter 11 and the power transmission unit 40. The frequency converter 11 is connected to an electric power supply 10. The frequency converter 11 adjusts the frequency of AC current supplied from the power supply 10.

In FIG. 2, each of the power transmission unit 40 and the power receiving unit 90 has a resonance circuit that is formed by two or more capacitors and coils. The resonance frequency of the resonance circuit of the power transmission unit 40 is equal to or substantially equal to the resonance frequency of the resonance circuit of the power receiving unit 90.

The resonance frequencies are said to be substantially equal to each other, when a difference between the resonance frequencies of the respective resonance circuits is equal to or smaller than several kHz. If the difference between the resonance frequencies is within this range, electric power can be favorably transmitted between the power transmission unit 40 and the power receiving unit 90.

The Q value of the resonance circuit of the power transmission unit 40 is equal to or larger than 100, and the Q value of the resonance circuit of the power receiving unit 90 is also equal to or larger than 100.

Figure 3:
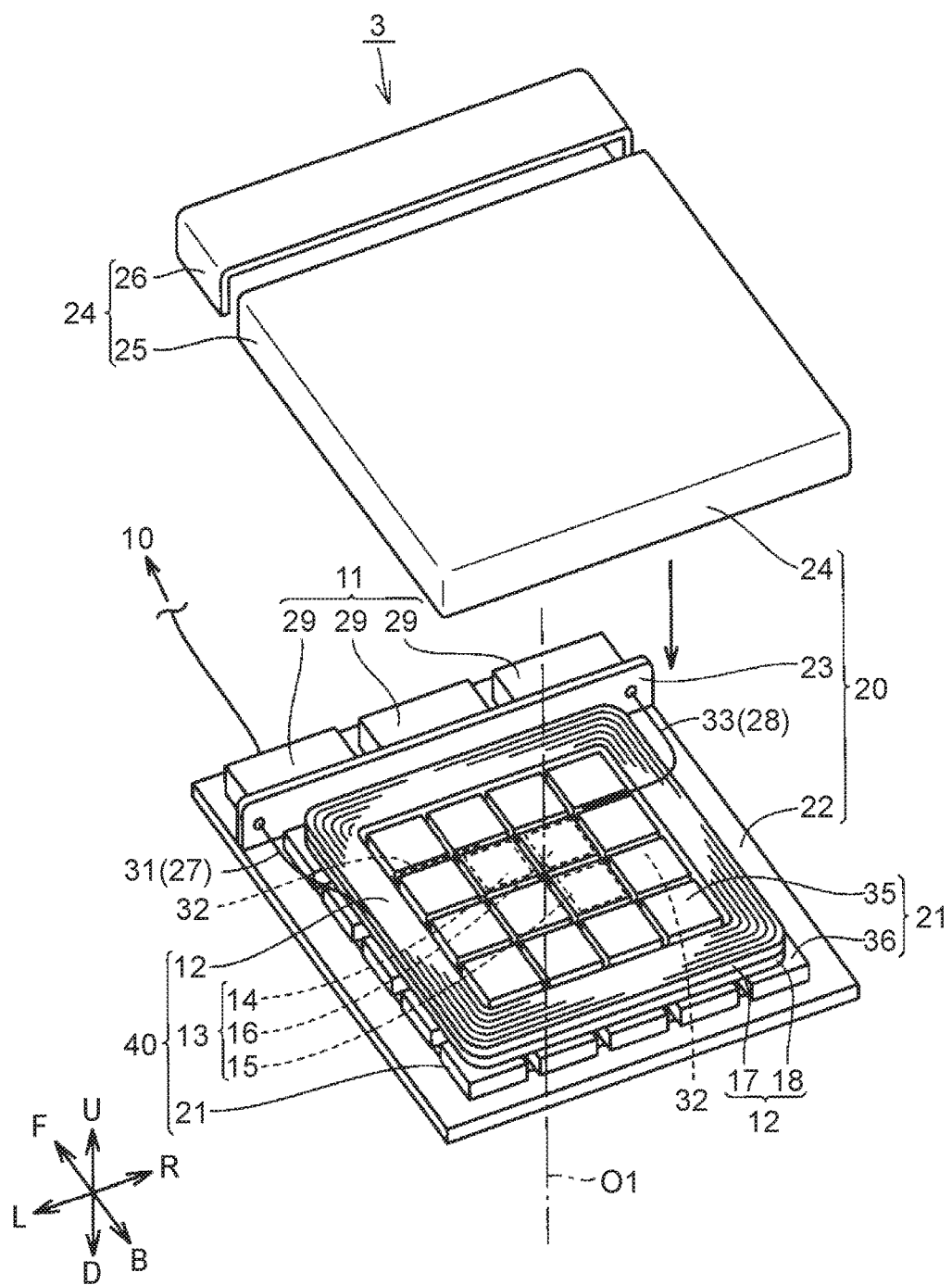
FIG. 3 is an exploded perspective view of an electric power transmission device according to one embodiment of the disclosure.

By setting the resonance frequencies and Q values of the power transmission unit 40 and power receiving unit 90 as described above, it is possible to transmit and receive electric power between the power transmission unit 40 and the power receiving unit 90 with high efficiency, FIG. 3 shows the power transmission device 3 according to one embodiment of the disclosure. As shown in FIG. 3, the power transmission device 3 includes the power transmission unit 40, and the case 20 in which the power transmission unit 40 is housed.

The case 20 includes a metal base plate 22 disposed on the ground, or the like, a metal partition plate 23 provided on an upper surface of the base plate 22, and a lid 24.

The lid 24 includes a resin lid 25 and a metal lid 26. The resin lid 25 is located so as to cover a part of the upper surface of the base plate 22, thereby to form a space in which the power transmission unit 40 is housed. Also, the metal lid 26 is located so as to cover a part of the upper surface of the base plate 22, thereby to form a space in which the frequency converter 11 is housed.

The partition plate 23 is formed on the upper surface of the base plate 22, so as to separate the space in which the power transmission unit 40 is housed, from the space in which the frequency converter 11 is housed.

The frequency converter 11 includes two or more high-voltage devices 29, and the metal lid 26 serves to protect the frequency converter 11, and also prevent noise generated from the respective high-voltage devices 29 from propagating around the power transmission device 3.

The resin lid 25 is formed of a resin material that permits passage of magnetic field and magnetic flux through the lid 25.

The power transmission unit 40 includes a ferrite 21, a coil unit 12 provided on the upper surface of the ferrite 21, and a capacitor unit 13 disposed on the lower surface side of the ferrite 21.

The ferrite 21 includes a peripheral annular core 36 formed by arranging a plurality of split ferrites in an annular shape, and a middle ferrite 35 disposed on the upper surface of the peripheral annular core 36 so as to contact with an inner edge portion of the peripheral annular core 36. The middle ferrite 35 is also formed by arranging a plurality of split ferrites such that they are spaced from each other. The middle ferrite 35 is disposed so as to close an opening of the peripheral annular core 36.

The coil unit 12 includes a coil 17 disposed on the upper surface of the peripheral annular core 36, and a coil 18 disposed on the upper surface of the coil 17.

Each of the coil 17 and the coil 18 is formed by winding a coil wire around a winding axis O1, and the coil 17 and the coil 18 are positioned such that the winding axis O1 is oriented in the vertical direction. Planar spiral coils are employed as the coil 17 and the coil 18.

A wire 31 connected to the frequency converter 11 is connected to one end portion of the coil 17. A wire 33 connected to the frequency converter 11 is connected to a capacitor 16 which will be described below.

The capacitor unit 13 includes a capacitor 14, a capacitor 15, and the capacitor 16. Each of the capacitors 14, 15, 16 is disposed on the lower surface side of the ferrite 21.

Figure 4:
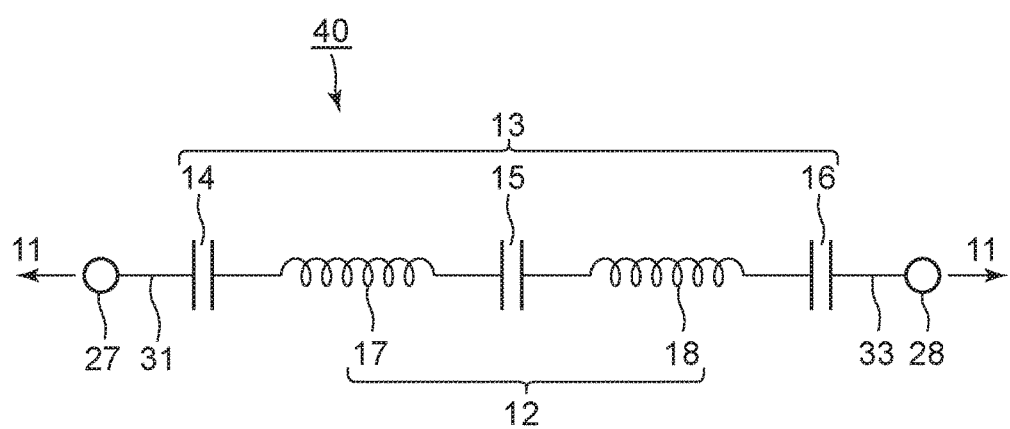
FIG. 4 is a circuit diagram showing a power transmission unit of the power transmission device of FIG. 3.

FIG. 4 shows the power transmission unit 40. As shown in FIG. 4, the power transmission unit 40 includes a node 27, a node 28, and the capacitor 14, coil 17, capacitor 15, coil 18, and the capacitor 16, which are connected in series in this order between the node 27 and the node 28.

More specifically, one electrode of the capacitor 14 is connected to the node 27 (wire 31), and the other electrode of the capacitor 14 is connected to one end portion of the coil 17. The other end portion of the coil 17 is connected to one electrode of the capacitor 15, and the other electrode of the capacitor 15 is connected to one end portion of the coil 18. The other end portion of the coil 18 is connected to one electrode of the capacitor 16. The other electrode of the capacitor 16 is connected to the node 28 (wire 33).

The node 27 is a wire connection point that connects one electrode of the capacitor 14 with the frequency converter 11, and the node 28 is a wire connection point that connects the other electrode of the capacitor 16 with the frequency converter 11.

Figure 5:
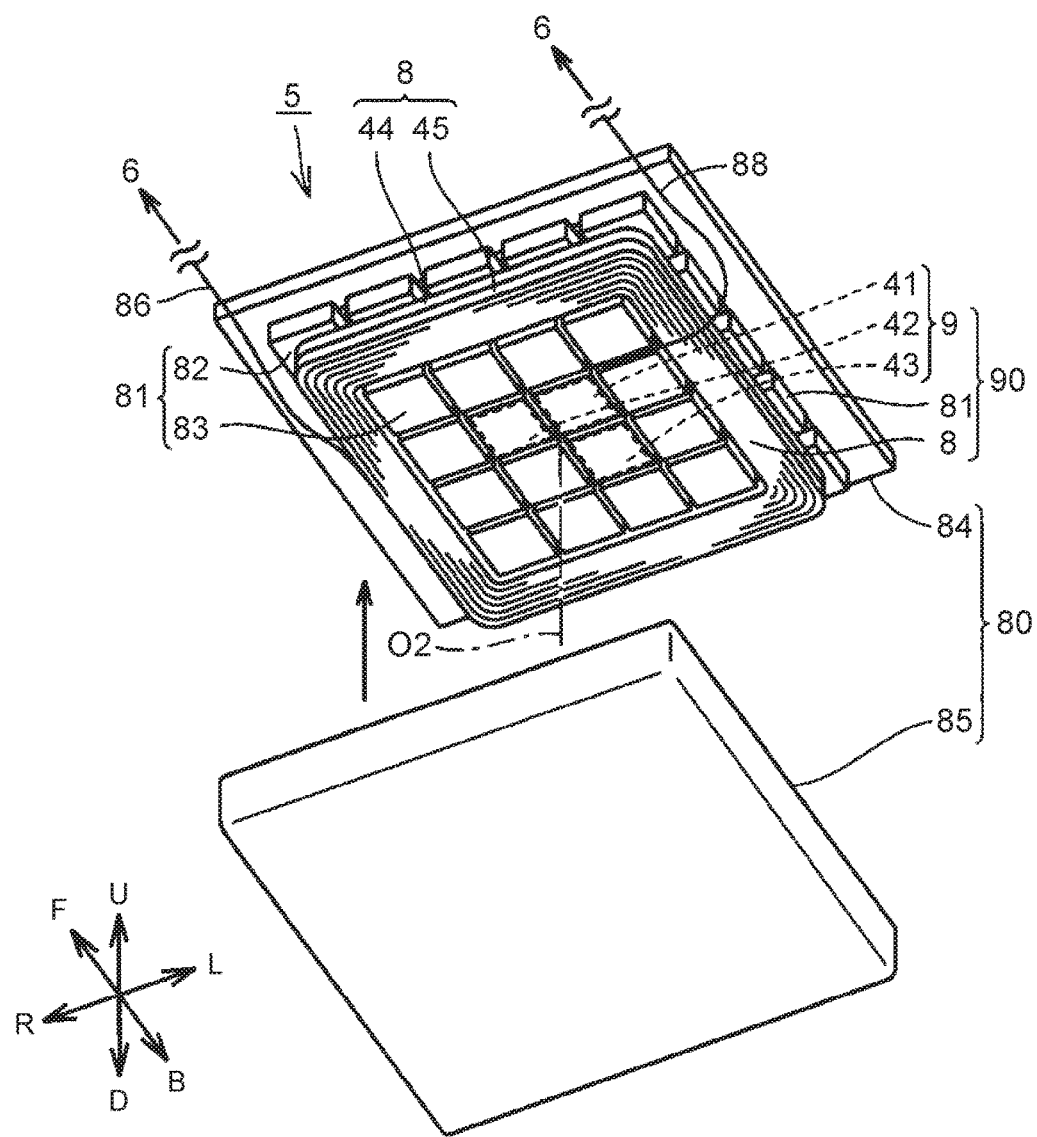
FIG. 5 is an exploded perspective view showing an electric power receiving device according to one embodiment of the disclosure.

FIG. 5 shows the power receiving device 5 according to one embodiment of the disclosure. As shown in FIG. 5, the power receiving device 5 includes the power receiving unit 90, and the case 80 in which the power receiving unit 90 is housed.

The case 80 includes a base plate 84 disposed under a floor panel of the vehicle, and a resin lid 85 disposed so as to cover the base plate 84 from below.

The base plate 84 is formed of metal, for example, and functions as a shield. In the case where a shield plate is additionally disposed between the base plate 84 and the floor panel, the base plate 84 may be formed of a resin material.

The resin lid 85 is formed of a material, such as a resin material, through which magnetic field and magnetic flux can permeate. The resin lid 85 is disposed so as to cover the base plate 84 from below. With the resin lid 85 thus mounted on the base plate 84, a space that houses the power receiving unit 90 is formed between the resin lid 85 and the base plate 84.

The power receiving unit 90 includes a ferrite 81, a capacitor unit 9, and a coil unit 8. The ferrite 81 includes a peripheral annular ferrite 82 including a plurality of split ferrites arranged in an annular shape, and a middle ferrite 83 disposed on the lower surface of the peripheral annular ferrite 82. The middle ferrite 83 includes a plurality of split ferrites, and is located so as to close an opening of the peripheral annular ferrite 82.

The coil unit 8 includes a coil 44 disposed on the lower surface of the peripheral annular ferrite 82, and a coil 45 disposed on the lower surface of the coil 44.

Each of the coil 44 and the coil 45 is formed by winding a coil wire around a winding axis O2, and the coil 44 and the coil 45 are positioned such that the winding axis O2 extends in the vertical direction. Planar spiral coils are employed as the coils 44, 45.

The capacitor unit 9 includes a capacitor 41, a capacitor 42, and a capacitor 43. A wire 86 connected to the rectifier 6 is connected to one end portion of the coil 44, and a wire 88 connected to the rectifier 6 is connected to the capacitor 43.

Figure 6:
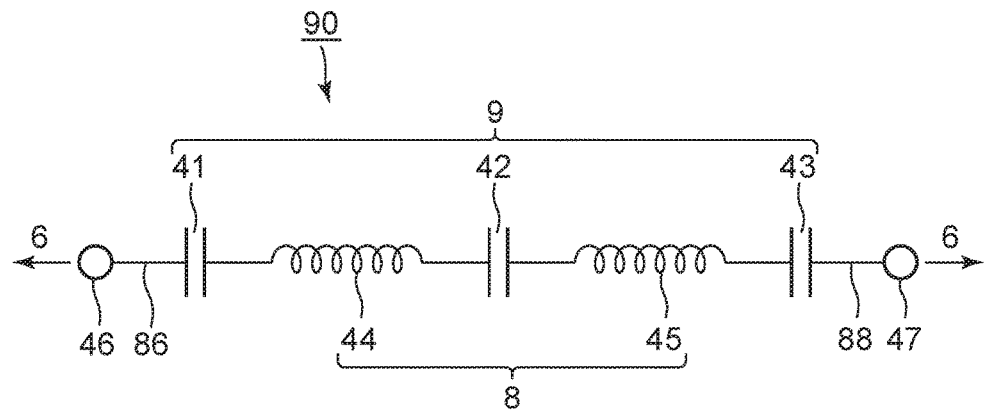
FIG. 6 is a circuit diagram showing a power receiving unit of the power receiving device of FIG. 5.

FIG. 6 shows the power receiving unit 90. As shown in FIG. 6, the power receiving unit 90 includes a node 46, a node 47, and the capacitor 41, coil 44, capacitor 42, coil 45, and the capacitor 43, which are connected in series in this order between the node 46 and the node 47.

Referring to FIG. 1, in the contactless charging system 1, when electric power is contactlessly or wirelessly transmitted from the power transmission device 3 to the power receiving device 5, AC current is supplied from the power supply 10 to the frequency converter 11. The frequency converter 11 adjusts the frequency and supplies the resulting current to the power transmission unit 40. The power-transmission frequency of the current supplied to the power transmission unit 40 is equal to the resonance frequency of the power transmission unit 40.

Figure 7:
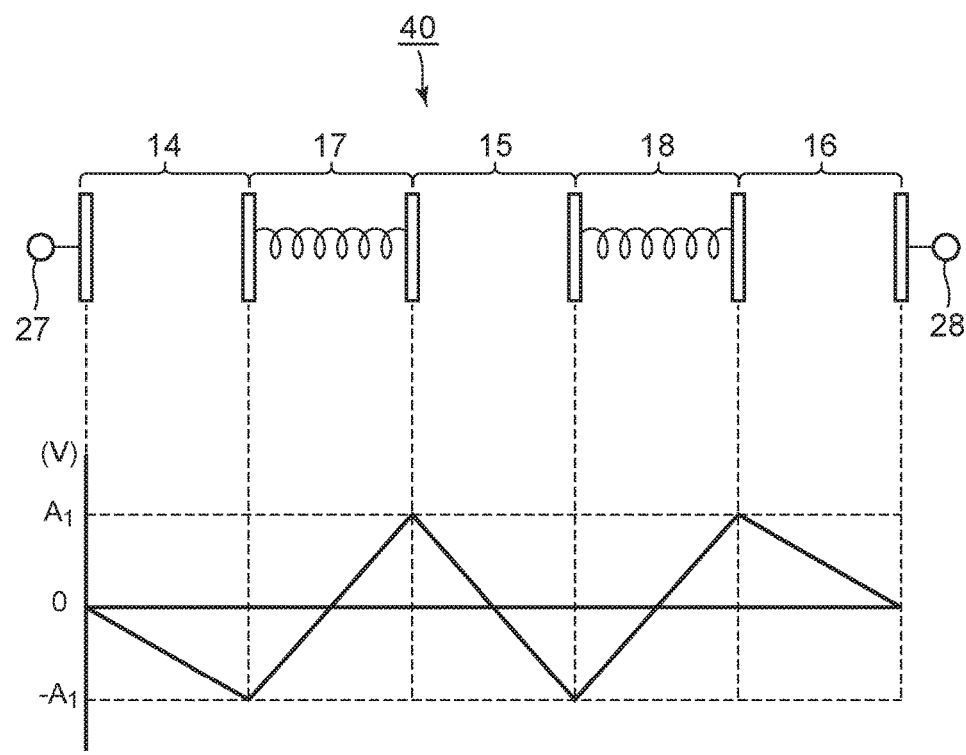
FIG. 7 is a graph showing voltage distribution among a capacitor, a coil, a capacitor, a coil, and a capacitor, when AC current having a power-transmission frequency is supplied to the power transmission unit.

The graph of FIG. 7 shows voltage distribution in the capacitor 14, coil 17, capacitor 15, coil 18, and the capacitor 16, when the AC current having the power-transmission frequency is supplied to the power transmission unit 40. In FIG. 7, the horizontal axis indicates locations of the above components, and the vertical axis indicates voltage.

The AC current $I_1$ supplied to the power transmission unit 40 can be expressed by the following equation (1) as a general expression, and the voltage $V_1$ applied to the power transmission unit 40 can be expressed by the following equation (2).

$$I_1 = I_{01} \sin \omega t \tag{1}$$

$$V_1 = I_{01} \times |Z| \sin(\omega t + \theta) \tag{2}$$

In the above equations, θ, Z and |Z| are expressed as follows:

$$\theta = \tan^{-1}[\{\omega L_{17} + \omega L_{18} - 1/(\omega C_{14}) - 1/(\omega C_{15}) - 1/(\omega C_{16})\}/R]$$

$$Z = R + j\{\omega L_{17} + \omega L_{18} - 1/(\omega C_{14}) - 1/(\omega C_{15}) - 1/(\omega C_{16})\}$$

$$|Z| = [R^2 + \{\omega L_{17} + \omega L_{18} - 1/(\omega C_{14}) - 1/(\omega C_{15}) - 1/(\omega C_{16})\}^2]^{1/2}$$

where "$I_{01}$" is the maximum value of the AC current $I_1$, "ω" is the angular velocity of the AC current, and "Z" is the impedance of the power transmission unit 40. "$L_{17}$" is the inductance of the coil 17, and "$L_{18}$" is the inductance of the coil 18. "$C_{14}$" is the capacitance of the capacitor 14, and "$C_{15}$" is the capacitance of the capacitor 15. "$C_{16}$" is the capacitance of the capacitor 16. "R" is the equivalent series resistance (not shown) of the coils 17, 18 and the capacitors 14, 15, 16.

In this embodiment, the power-transmission frequency of the current supplied to the power transmission unit 40 is the resonance frequency of the power transmission unit 40.

Therefore, where $f_1$ denotes the power-transmission frequency (the resonance frequency of the power transmission unit 40), the angular velocity at this time is expressed as $\omega_1 = 2\pi f_1$.

At this time, the impedance of the circuit assumes the minimum value, and |Z| is equal to 0 since the resistance component R is negligibly small in the power transmission unit 40.

Therefore, the following equation is derived from the above-indicated equation (2).

$$V_1 = I_{01} \times |Z| \sin(\omega t + \theta) = 0$$

Namely, in the power transmission unit 40, the voltages at the opposite ends of the power transmission unit 40 are always equal to 0V.

The case where the current having the power-transmission frequency $f_1$ is passed through the capacitors 14, 15, 16 will be studied. Where the potentials of the electrodes of the capacitors 14, 15, 16 closer to the node 27 are equal to 0V, voltages $V_{14}$, $V_{15}$, $V_{16}$ of the electrodes of the capacitors 14, 15, 16 closer to the node 28 can be expressed by the following equations (3)-(5).

$$V_{14}=[I_{01}\sin(\omega_1 t-\pi/2)]/(\omega_1 C_{14}) \tag{3}$$

$$V_{15}=[I_{01}\sin(\omega_1 t-\pi/2)]/(\omega_1 C_{15}) \tag{4}$$

$$V_{16}=[I_{01}\sin(\omega_1 t-\pi/2)]/(\omega_1 C_{16}) \tag{5}$$

Also, the case where the current having the power-transmission frequency $f_1$ is passed through the coil 17 and the coil 18 will be studied. Where the potentials of the end portions of the coil 17 and the coil 18 closer to the node 27 are equal to 0V, the voltages $V_{17}$, $V_{18}$ of the end portions of the coils 17, 18 closer to the node 28 can be expressed by the following equations (6), (7).

$$V_{17}=\omega L_{17} I_{01}\sin(\omega_1 t+\pi/2) \tag{6}$$

$$V_{18}=\omega L_{18} I_{01}\sin(\omega_1 t+\pi/2) \tag{7}$$

As is apparent from the above-indicated equations (3)-(7), the voltage phase of each of the capacitors 14, 15, 16 is shifted by $\pi$ from the voltage phase of the coils 17, 18.

Therefore, when the voltage rises in each of the capacitors 14, 15, 16, for example, the voltage drops in each of the coils 17, 18.

The graph shown in FIG. 7 indicates instantaneous values obtained when the current having the power-transmission frequency $f_1$ is supplied to the power transmission unit 40. In FIG. 7, t is equal to $t_1$ ($t=t_1$). At the time shown in FIG. 7, the voltage drops in the capacitors 14, 15, 16, and the voltage rises in the coils 17, 18.

In the example shown in FIG. 7, the inductance $L_{17}$ of the coil 17 is set to be equal to or substantially equal to the inductance $L_{18}$ of the coil 18.

$$L_{17}=L_{18} \tag{8}$$

Also, the capacitors 14, 16 are formed such that the capacitance $C_{14}$ of the capacitor 14 is equal to or substantially equal to the capacitance $C_{16}$ of the capacitor 16. The capacitance $C_{15}$ of the capacitor 15 is smaller than the capacitance $C_{14}$, $C_{16}$, and is set to a half of the capacitance $C_{14}$, $C_{16}$. More specifically, the capacitances $C_{14}$, $C_{15}$, $C_{16}$ are set so as to satisfy the following equation (9).

$$C_{15}=C_{14}/2=C_{16}/2 \tag{9}$$

Furthermore, the capacitances $C_{14}$, $C_{15}$, $C_{16}$ and the inductances $L_{17}$, $L_{18}$ are set so as to satisfy the relationship as indicated by the following equation (10).

$$2/\omega_1 C_{14}=1/\omega_1 C_{15}=2/\omega_1 C_{16}=\omega_1 L_{17}=\omega_1 L_{18} \tag{10}$$

Since each inductance and each capacitance are set, as indicated by Eq. (9) and Eq. (10) above, the potential of the node 27, which is equal to 0V, is lowered to $-A_1(V)$, at a joint point of the capacitor 14 and the coil 17. The voltage drops by $A_1$ by means of the capacitor 14.

$$|A_1|=|[I_{01}\sin(\omega_1 t_1-\pi/2)]/(\omega_1 C_{14})|$$

Then, the voltage rises to $A_1$ (V), at a connection point of the coil 17 and the capacitor 15. Namely, the voltage rises by $2A_1$ by means of the coil 17.

$$|2A_1|=|\omega L_{17} I_{01}\sin(\omega_1 t_1+\pi/2)| \tag{11}$$

Then, the potential at a joint point between the capacitor 15 and the coil 18 is lowered to $-A_1$ (V). Namely, the voltage drops by $2A_1$ by means of the capacitor 15.

$$|2A_1|=|[I_{01}\sin(\omega_1 t_1-\pi/2)]/(\omega_1 C_{15})|$$

Then, the potential at a joint point of the coil 18 and the capacitor 16 rises to $A_1$ (V). Namely, the voltage rises by $2A_1$ by means of the coil 18.

$$|2A_1|=|\omega L_{18} I_{01}\sin(\omega_1 t_1+\pi/2)| \tag{12}$$

Then, the potential of the node 28 is lowered to 0V. Namely, the voltage drops by $A_1$ by means of the capacitor 16.

$$|A_1|=|[I_{01}\sin(\omega_1 t_1-\pi/2)]/(\omega_1 C_{16})|$$

As shown in FIG. 7, the average voltage obtained from the voltage distribution in the power transmission unit 40 is equal to 0V during transmission of electric power. Therefore, the voltage can be kept at a low level, throughout the power transmission unit 40. The average voltage in the power transmission unit 40 is kept at 0V even if t varies.

Figure 8:
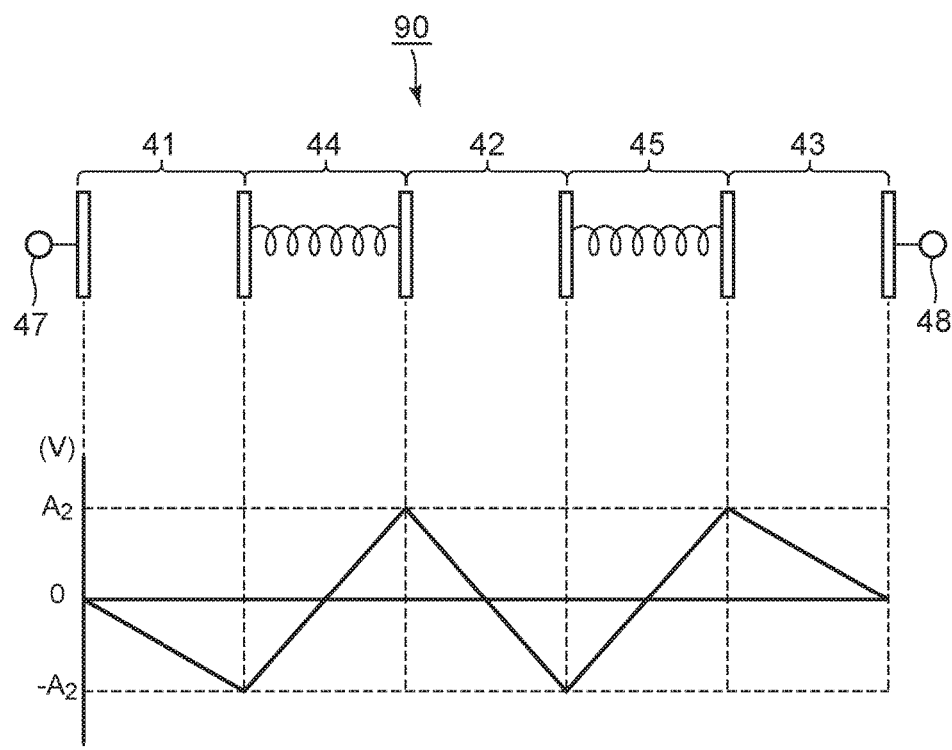
FIG. 8 is a graph showing voltage distribution in the power receiving unit when it receives electric power.

The graph of FIG. 8 shows voltage distribution in the power receiving unit 90 when it receives electric power from the power transmission unit 40. If the AC current having the power-transmission frequency $f_1$ is supplied to the power transmission unit 40, magnetic field is formed around the power transmission unit 40. The frequency of this magnetic field is also equal to the power-transmission frequency $f_1$, and current having the power-transmission frequency $f_1$ flows through the power receiving unit 90 that receives electric power from the magnetic field.

Where $I_2$ denotes current of the received power, and $V_2$ denotes voltage of the received power, the received current $I_2$ and the received voltage $V_2$ can be expressed by the following equations (13) and (14) as general expressions.

$$I_2=I_{02}\sin\omega t \tag{13}$$

$$V_2=I_{02}\times|Z|\sin(\omega t+\theta) \tag{14}$$

In the above equations, $\theta$, Z and $|Z|$ are expressed as follows:

$$\theta=\tan^{-1}[\{\omega L_{44}+\omega L_{45}-1/(\omega C_{41})-1/(\omega C_{42})-1/(\omega C_{43})\}/R]$$

$$Z=R+j\{\omega L_{44}+\omega L_{45}-1/(\omega C_{41})-1/(\omega C_{42})-1/(\omega C_{43})\}$$

$$|Z|=[R^2+\{\omega L_{44}+\omega L_{45}-1/(\omega C_{41})-1/(\omega C_{42})-1/(\omega C_{43})\}^2]^{1/2}$$

where "$I_{02}$" is the maximum value of the received current $I_2$, "$\omega$" is the angular velocity of the AC current, and "Z" is the impedance of the power receiving unit 90. "$L_{44}$" is the inductance of the coil 44, and "$L_{45}$" is the inductance of the coil 45. "$C_{41}$" is the capacitance of the capacitor 41, and "$C_{42}$" is the capacitance of the capacitor 42. "$C_{43}$" is the capacitance of the capacitor 43. "R" is the equivalent series resistance (not shown) of the coils 44, 45 and the capacitors 41, 42, 43.

Since the resonance frequency of the power receiving unit 90 is equal to the resonance frequency of the power transmission unit 40, the impedance of the power receiving unit 90 is minimized if the current having the power-transmission frequency $f_1$ flows through the power receiving unit 90. In the power receiving unit 90, too, the resistance component R is negligibly small; therefore, if the current having the power-transmission frequency $f_1$ flows through the power receiving unit 90, the voltage of the node 46 and node 47 of the power receiving unit 90 becomes equal to 0V.

The case where the current having the power-transmission frequency $f_1$ flows through the capacitors 41, 42, 43 will be studied. Where the potentials of the electrodes of the capacitors 41, 42, 43 closer to the node 46 are equal to 0V, the voltages $V_{41}$, $V_{42}$, $V_{43}$ of the electrodes of the capacitors 41, 42, 43 closer to the node 47 can be expressed by the following equations (15)-(17).

$$V_{41}=[I_{02}\sin(\omega_1 t-\pi/2)]/(\omega_1 C_{41}) \quad (15)$$

$$V_{42}=[I_{02}\sin(\omega_1 t-\pi/2)]/(\omega_1 C_{42}) \quad (16)$$

$$V_{43}=[I_{02}\sin(\omega_1 t-\pi/2)]/(\omega_1 C_{43}) \quad (17)$$

Also, the case where the current having the power-transmission frequency $f_1$ flows through the coil 44 and the coil 45 will be studied. Where the potentials of the end portions of the coil 44 and the coil 45 closer to the node 46 are equal to 0V, the voltages $V_{44}$, $V_{45}$ of the end portions of the coils 44, 45 closer to the node 47 can be expressed by the following equations (18), (19).

$$V_{44}=\omega L_{44}I_{02}\sin(\omega_1 t+\pi/2) \quad (18)$$

$$V_{45}=\omega L_{45}I_{02}\sin(\omega_1 t+\pi/2) \quad (19)$$

As is apparent from the above-indicated equations (15)-(19), the voltage phase of each of the capacitors 41, 42, 43 is shifted by $\pi$ from the voltage phase of the coils 44, 45.

Therefore, when the voltage rises in each of the capacitors 41, 42, 43, for example, the voltage drops in each of the coils 44, 45.

The graph shown in FIG. 8 indicates instantaneous values obtained when the current having the power-transmission frequency $f_1$ is supplied to the power receiving unit 90. In FIG. 8, t is equal to $t_2$ ($t=t_2$). At the time shown in FIG. 8, the voltage drops in the capacitors 41, 42, 43, and the voltage rises in the coils 44, 45.

In the example shown in FIG. 8, the inductance $L_{44}$ of the coil 44 is set to be equal to or substantially equal to the inductance $L_{45}$ of the coil 45.

$$L_{44}=L_{45} \quad (20)$$

Also, the capacitors 41, 42 are formed such that the capacitance $C_{41}$ of the capacitor 41 is equal to or substantially equal to the capacitance $C_{43}$ of the capacitor 43. The capacitance $C_{42}$ of the capacitor 42 is smaller than the capacitance $C_{41}$, $C_{43}$, and is set to a half of the capacitance $C_{41}$, $C_{43}$. More specifically, the capacitances $C_{41}$, $C_{42}$, $C_{43}$ are set so as to satisfy the following equation (21).

$$C_{42}=C_{41}/2=C_{43}/2 \quad (21)$$

Furthermore, the capacitances $C_{41}$, $C_{42}$, $C_{43}$ and the inductances $L_{44}$, $L_{45}$ are set so as to satisfy the relationship as indicated by the following equation (22).

$$2/\omega_1 C_{41}=1/\omega_1 C_{42}=2/\omega_1 C_{43}=\omega_1 L_{44}=\omega_1 L_{45} \quad (22)$$

Since each inductance and each capacitance are set, as indicated by Eq. (21) and Eq. (22) above, the potential of the node 46, which is equal to 0V, is lowered to $-A_2$ (V), at a joint point of the capacitor 41 and the coil 44. Namely, the voltage drops by $A_2$ in the capacitor 41.

$$|A_2|=|[I_{02}\sin(\omega_1 t_2-\pi/2)]/(\omega_1 C_{41})|$$

Then, the voltage rises to $A_2$ (V), at a connection point of the coil 44 and the capacitor 42. Namely, the voltage rises by $2A_2$ by means of the coil 44.

$$|2A_2|=|\omega L_{44}I_{02}\sin(\omega_1 t_2+\pi/2)| \quad (23)$$

Then, the potential at a joint point of the capacitor 42 and the coil 45 is lowered to $-A_2$ (V). Namely, the voltage drops by $2A_2$ by means of the capacitor 42.

$$|2A_2|=|[I_{02}\sin(\omega_1 t_2-\pi/2)]/(\omega_1 C_{42})|$$

Then, the potential at a joint point of the coil 45 and the capacitor 43 rises to $A_2$ (V). Namely, the voltage rises by $2A_2$ by means of the coil 45.

$$|2A_2|=|\omega L_{45}I_{02}\sin(\omega_1 t_2+\pi/2)| \quad (24)$$

Then, the potential of the node 47 is lowered to 0V. Namely, the voltage drops by $A_2$ by means of the capacitor 43.

$$|A_2|=|[I_{02}\sin(\omega_1 t_2-\pi/2)]/(\omega_1 C_{43})|$$

As shown in FIG. 8, the average voltage obtained from the voltage distribution in the power receiving unit 90 is equal to 0V during transmission of electric power. Therefore, the voltage can be kept at a low level, throughout the power receiving unit 90. The average voltage in the power receiving unit 90 is kept at 0V even if t varies.

The operation and effect of the power receiving unit and the power transmission unit according to the above embodiments will be described, using an electric power transmission unit 50 and an electric power receiving unit 60 as comparative examples.

Figure 9:
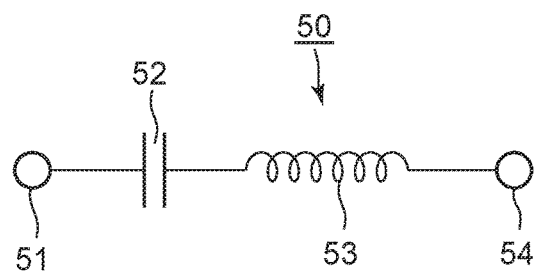
FIG. 9 is a circuit diagram of a power transmission unit according to a comparative example.

FIG. 9 shows the power transmission unit 50 according to a comparative example. As shown in FIG. 9, the power transmission unit 50 includes a capacitor 52 and a coil 53 connected in series with each other, between a node 51 and a node 54.

The resonance frequency of the power transmission unit 50 is equal to the resonance frequency of the power transmission unit 40 shown in FIG. 4.

Therefore, where $C_{52}$ denotes the capacitance of the capacitor 52, and $L_{53}$ denotes the inductance of the coil 53, the following equations (25) and (26) are satisfied.

$$L_{53}=L_{17}+L_{18} \quad (25)$$

$$1/C_{52}=1/C_{14}+1/C_{15}+1/C_{16} \quad (26)$$

Figure 11:
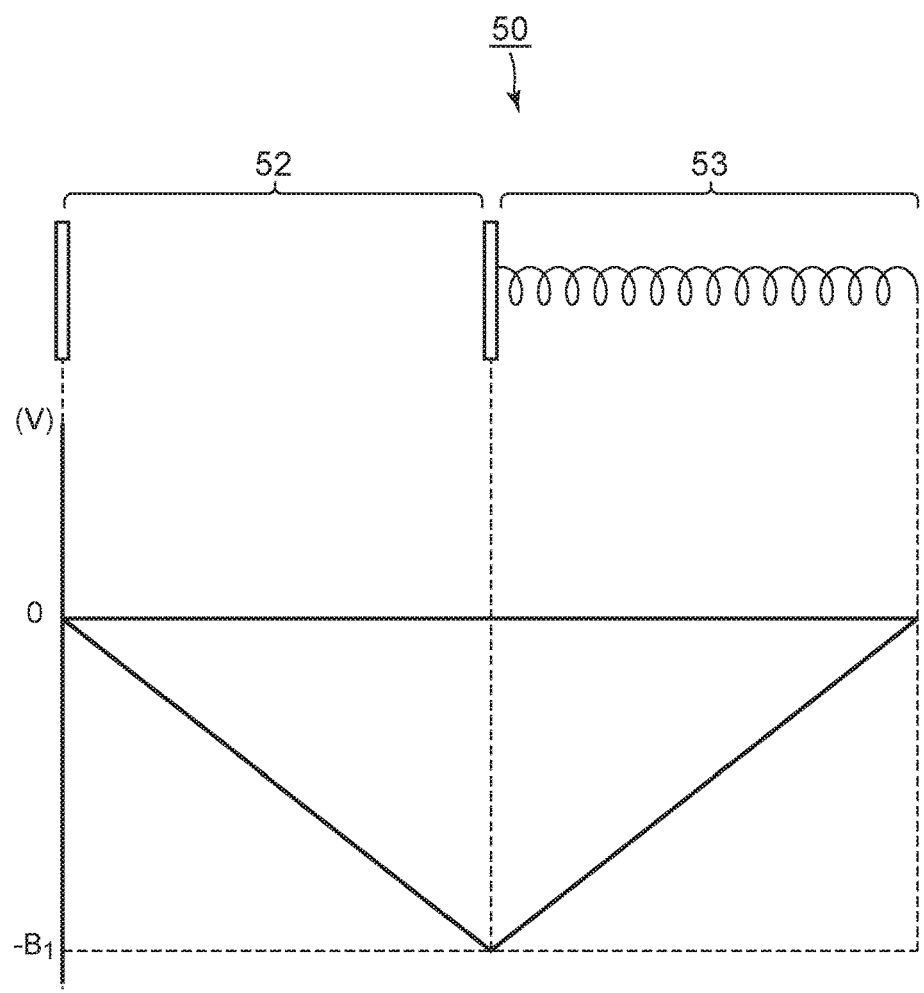
FIG. 11 is a graph showing voltage distribution in the power transmission unit of the comparative example.

Then, in FIG. 11, since the resonance frequency of the power transmission unit 50 is equal to or substantially equal to the power-transmission frequency $f_1$, the impedance is equal to 0 in the power transmission unit 50 if the AC current of the power-transmission frequency $f_1$ flows through the power transmission unit 50. As a result, during transmission of electric power, the voltage at the opposite ends of the power transmission unit 50 is equal to 0V. Also, the time indicated in FIG. 11 is the same as the time indicated in FIG. 4, and t is equal to $t_1$ ($t=t_1$) in FIG. 11.

Then, the voltage of the electrode of the capacitor 52 closer to the node 51 is 0V, and a voltage $-B_1$ at a connection point of the capacitor 52 and the coil 53 can be expressed by the following equation (27).

$$-B_1=-|[I_{01}\sin(\omega_1 t_1-\pi/2)]/(\omega_1 C_{52})| \quad (27)$$

Then, the voltage rises by $B_1$ in the coil 53.

$$B_1=|\omega L_{53}I_{01}\sin(\omega_1 t_1+\pi/2)| \quad (28)$$

Here, $|A_1|$ shown in FIG. 7 is compared with $|B_1|$ shown in FIG. 11.

According to the above-indicated equations (11) and (12), $|A_1|$ can be expressed as follows.

$$|A_1|=|\omega L_{17}I_{01}\sin(\omega_1 t_1+\pi/2)|/2$$

$$|A_1|=|\omega L_{18}I_{01}\sin(\omega_1 t_1+\pi/2)|/2$$

Here, according to the above-indicated equations and Eq. (25) and Eq. (28), the following equation (29) is established.

$$|B_1|=2\times|A_1| \quad (29)$$

Thus, according to the power transmission unit 40 of this embodiment, the maximum value of the absolute value of the voltage can be reduced to be lower than that of the power transmission unit 50 according to the comparative example. Furthermore, as is apparent from FIG. 7 and FIG. 11, the average voltage can be reduced according to the power transmission unit 40 of this embodiment, to be lower than that of the power transmission unit 50 according to the comparative example.

Thus, in FIG. 3, for example, a potential difference between the coil unit 12 and the ferrite 21 can be reduced. With the potential difference between the coil unit 12 and the ferrite 21 thus reduced, even if parasite capacitance is formed between the ferrite 21 and the coil unit 12, the potential of the ferrite 21 is prevented from being elevated. Since the potential of the ferrite 21 can be prevented from being elevated, a potential difference between the ferrite 21 and the base plate 22 is less likely or unlikely to be large. As a result, a potential difference between the coil unit 12 and the base plate 22 can be reduced.

Furthermore, since the maximum value of the absolute value of the voltage developed in the coil unit 12 can be reduced, a potential difference between the coil unit 12, and the ferrite 21 and base plate 22 provided around the coil unit 12, can also be reduced.

In particular, since the capacitance $C_{15}$ of the capacitor 15 is made smaller than the capacitances $C_{14}$, $C_{16}$ of the other capacitors 14, 16, the voltage drop (voltage rise) that occurs in the capacitor 15 is larger than the voltage drop (voltage rise) that occurs in the capacitors 14, 16.

With this arrangement, even if the voltage rises (drops) largely in the coil 17, the voltage drops (rises) largely in the capacitor 15, so that the average voltage of the power transmission unit 40 can be prevented from being large.

Furthermore, the inductance $L_{17}$ of the coil 17 is made equal to or substantially equal to the inductance $L_{18}$ of the coil 18, so that the voltage distribution that appears in the power transmission unit 40 becomes symmetrical about the capacitor 15. In this manner, the average voltage of the power transmission unit 40 can be made close to 0.

In this connection, the inductance $L_{17}$ and the inductance $L_{18}$ are said to be substantially equal to each other, when a difference between the inductance $L_{17}$ and the inductance $L_{18}$ is equal to or smaller than 5% of the inductance $L_{17}$. If the difference in the inductance is within the above-indicated range, the average voltage of the voltage distribution in the power transmission unit 40 becomes approximate to 0.

Figure 10:
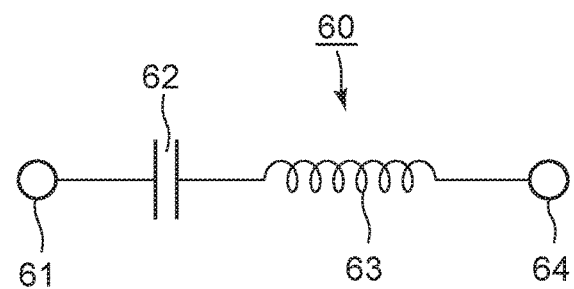
FIG. 10 is a circuit diagram of a power receiving unit according to a comparative example.

FIG. 10 shows the power receiving unit 60 according to a comparative example. As shown in FIG. 10, the power receiving unit 60 includes a capacitor 62 and a coil 63 connected in series with each other, between a node 61 and a node 64.

Both of the resonance frequency of the power receiving unit 60 and the resonance frequency of the power receiving unit 90 are equal to or substantially equal to the power-transmission frequency $f_1$.

Therefore, where $C_{62}$ denotes the capacitance of the capacitor 62, and $L_{63}$ denotes the inductance of the coil 63, the following equations (30) and (31) are satisfied.

$$L_{63}=L_{44}+L_{45} \tag{30}$$

$$1/C_{62}=1/C_{41}+1/C_{42}+1/C_{43} \tag{31}$$

Furthermore, since the resonance frequency of the power receiving unit 60 is equal to the power-transmission frequency $f_1$, the potentials at the node 61 and the node 64 are equal to 0V, as shown in FIG. 12, when the current having the transmission frequency $f_1$ flows through the power receiving unit 60.

Then, a voltage $-B_2$ at a connection point of the capacitor 62 and the coil 63 can be expressed by the following equation (32). The time shown in FIG. 12 is the same as the time shown in FIG. 8, and t is equal to $t_2$ ($t=t_2$) in the example shown in FIG. 12.

$$-B_2=-|[I_{02}\sin(\omega_1 t_2-\pi/2)]/(\omega_1 C_{62})| \tag{32}$$

Then, the voltage rises by $B_2$ in the coil 63.

$$B_2=|\omega L_{64} I_{02}\sin(\omega_1 t_2+\pi/2)| \tag{33}$$

Here, the graph shown in FIG. 8 is compared with the graph shown in FIG. 12.

According to the above-indicated equations (23) and (24), $|A_2|$ can be expressed as follows.

$$|A_2|=|\omega L_{44} I_{02}\sin(\omega_1 t_2+\pi/2)|/2$$

$$|A_2|=|\omega L_{45} I_{02}\sin(\omega_1 t_2+\pi/2)|/2$$

Here, according to the above-indicated two equations and Eq. (30) and Eq. (33), the relationship between $|B_2|$ and $|A_2|$ can be expressed by the following equation (34).

$$|B_2|=2\times|A_2| \tag{34}$$

As is apparent from this equation (34), the maximum value of the absolute value of the voltage developed in the power receiving unit 90 according to this embodiment can be reduced to be lower than the absolute value of the maximum value of the voltage of the power receiving unit 60 according to the comparative example. As a result, according to the power receiving unit 90 of this embodiment, potential differences between various members disposed around the power receiving unit 90, and the power receiving unit 90, can be reduced.

Furthermore, as is apparent from FIG. 8 and FIG. 12, the average potential of the power receiving unit 90 as a whole can be reduced to be lower than the average potential of the power receiving unit 60 as a whole of the comparative example.

In particular, since the capacitance $C_{42}$ of the capacitor 42 is set to be smaller than the capacitances $C_{41}$, $C_{43}$ of the other capacitors 41, 43, the voltage drop (voltage rise) that occurs in the capacitor 42 is larger than the voltage drop (voltage rise) that occurs in the capacitors 41, 43.

With this arrangement, even if the voltage rises largely in the coil 44, the voltage drops largely in the capacitor 42, so that the average voltage of the power receiving unit 90 as a whole can be prevented from being large.

Furthermore, the inductance $L_{44}$ of the coil 44 is made equal to or substantially equal to the inductance $L_{45}$ of the coil 45, so that the voltage distribution that appears in the power receiving unit 90 becomes symmetrical about the capacitor 42. In this manner, the average voltage of the power receiving unit 90 as a whole can be made close to 0.

In the power transmission unit 40 shown in FIG. 7, the coil 17 and the coil 18 are formed such that the inductance of the coil 17 is equal to or substantially equal to that of the coil 18, as indicated in the above equation (8). However, this arrangement is not an essential arrangement.

Furthermore, while the capacitance of each capacitor is set as indicated in the above equation (9), this arrangement is not an essential arrangement.

FIG. 13 shows a modified example of the power transmission unit 40 according to this embodiment. In the example shown in FIG. 13, a capacitor 114, a coil 117, a capacitor 115, a coil 118, and a capacitor 116 are connected in series with each other, between the node 27 and the node 28.

Here, $L_{117}$ denotes the inductance of the coil 117, and $L_{118}$ denotes the inductance of the coil 118.

Figure 14:
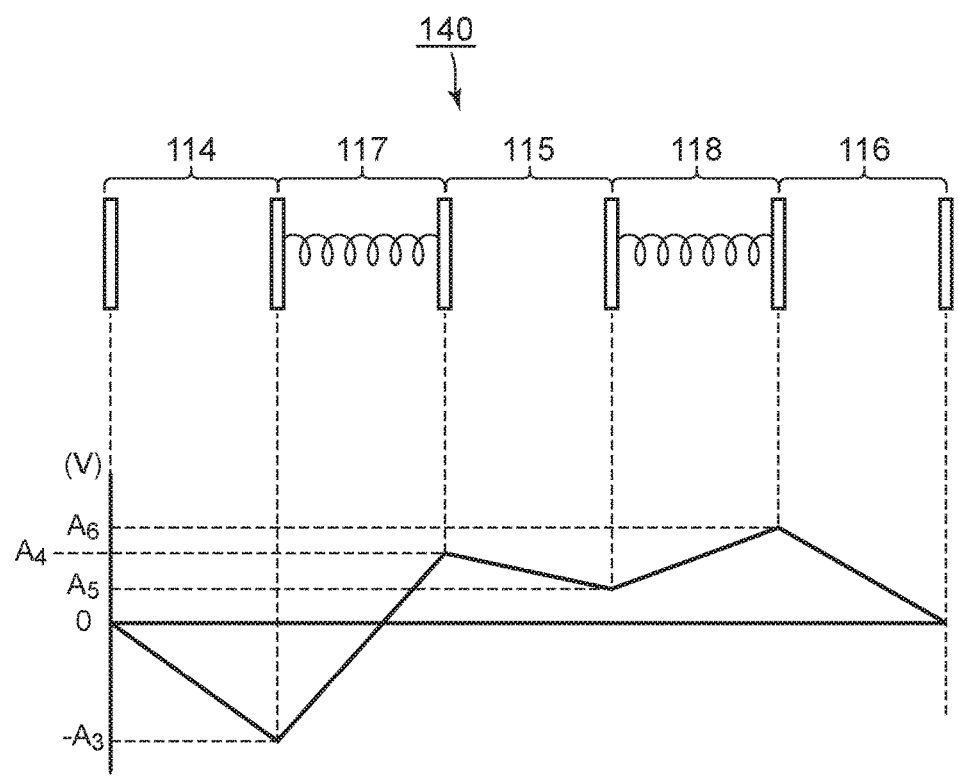
FIG. 14 is a graph showing instantaneous values of voltage distribution in the power transmission unit shown in FIG. 13.

Then, the inductances $L_{117}$, $L_{118}$ of the coils 117, 118 are set such that $L_{117} > L_{17} = L_{18} > L_{118}$. The graph of FIG. 14 shows instantaneous values ($t=t_1$) of the voltage distribution of the power transmission unit 140 shown in FIG. 13. In the power transmission unit 140 thus configured, the voltage drops in the capacitor 114, and the voltage rises in the coil 117. Then, the voltage drops in the capacitor 115, and the voltage rises in the coil 118. Then, the voltage drops in the capacitor 116.

Here, the voltage distribution shown in FIG. 14 is compared with the voltage distribution shown in FIG. 11. The inductance $L_{117}$ of the coil 117 of the modified example is smaller than the inductance $L_{53}$ of the coil 53 of the comparative example.

Therefore, the amount of voltage rise ($A_3+A_4$) that occurs in the coil 117 is smaller than the amount of voltage rise ($B_1$) that occurs in the coil 53.

Further, since the voltage drops by means of the capacitor 114 connected to the coil 117, the voltage of the coil 117 as a whole is low. Therefore, $|A_3|$ and $|A_4|$ are far smaller than $|B_1|$.

Similarly, since the voltage rises in the coil 118, and the voltage drops in the capacitor 115, $|A_6|$ of the voltage $A_6$ shown in FIG. 14 is far smaller than $|B_1|$.

Thus, with the capacitor, coil, capacitor, coil, and the capacitor sequentially connected in series, between the node 27 and the node 28, the maximum value of the absolute value of the voltage developed in the power transmission unit can be reduced, and the average voltage of the power transmission unit can be reduced.

In the power receiving unit, too, it is not essential that the inductance of the coil 44 is made equal to the inductance of the coil 45, and that the capacitance of the capacitor 42 is made larger than the capacitances of the capacitor 41 and the capacitor 43.

Namely, when the power receiving unit is configured such that the capacitor 41, coil 44, capacitor 42, coil 45, and the capacitor 43 are sequentially connected in series, between the node 46 and the node 47, the average voltage and the absolute value of the maximum value of the voltage can be reduced, as compared with the case where one coil and one capacitor are connected in series with each other.

While the embodiments of the disclosure and their modified examples have been described above, the matters described herein are merely exemplary in all aspects, and not restrictive. The technical scope of the disclosure is defined by the appended claims, and is intended to include all changes or modifications within the range of the claims and equivalents thereof.

The present disclosure can be applied to electric power receiving devices and electric power transmission devices.

What is claimed is:

1. An electric power receiving device, comprising:
an electric power receiving unit configured to contactlessly receive electric power from an electric power transmission device,
the power receiving unit including a first node, a second node, a first capacitor, a first coil, a second capacitor, a second coil, and a third capacitor,
the first capacitor, the first coil, the second capacitor, the second coil, and the third capacitor being sequentially connected in series, between the first node and the second node, and
a capacitance of the second capacitor being smaller than a capacitance of the first capacitor and a capacitance of the third capacitor.

2. The electric power receiving device according to claim 1, wherein an inductance of the first coil is equal to or substantially equal to an inductance of the second coil.

3. An electric power transmission device, comprising:
an electric power transmission unit configured to contactlessly transmit electric power to an electric power receiving device,
the power transmission unit including a third node, a fourth node, a fourth capacitor, a third coil, a fifth capacitor, a fourth coil, and a sixth capacitor,
the fourth capacitor, the third coil, the fifth capacitor, the fourth coil, and the sixth capacitor being sequentially connected in series, between the third node and the fourth node, and
a capacitance of the fourth capacitor being substantially equal to a capacitance of the sixth capacitor, and a capacitance of the fifth capacitor being smaller than the capacitance of the fourth capacitor.

4. The electric power transmission device according to claim 3, wherein an inductance of the third coil is equal to or substantially equal to an inductance of the fourth coil.

5. The electric power receiving device according to claim 1, wherein
the capacitance of the second capacitor is approximately half the capacitance of the first capacitor.

6. The electric power receiving device according to claim 1, wherein
one end of the first node is connected to the first capacitor and the other end of the first node is connected to a rectifier, and one end of the second node is connected to the third capacitor and the other end of the second node is connected to the rectifier.

7. The electric power transmission device according to claim 3, wherein
the capacitance of the fifth capacitor is approximately half the capacitance of the fourth capacitor.

8. The electric power transmission device according to claim 3, wherein
one end of the third node is connected to the fourth capacitor and the other end of the third node is connected to a frequency converter, and one end of the fourth node is connected to the sixth capacitor and the other end of the fourth node is connected to the frequency converter.

* * * * *